(12) United States Patent
Wang et al.

(10) Patent No.: US 11,347,979 B2
(45) Date of Patent: May 31, 2022

(54) MCMC FRAMEWORK-BASED SUB-HYPERGRAPH MATCHING METHOD AND DEVICE

(71) Applicant: Peking University Shenzhen Graduate School, Shenzhen (CN)

(72) Inventors: Wenmin Wang, Shenzhen (CN); Ruonan Zhang, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Hui Zhao, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 934 days.

(21) Appl. No.: 16/079,660

(22) PCT Filed: Mar. 10, 2016

(86) PCT No.: PCT/CN2016/076030
§ 371 (c)(1),
(2) Date: Aug. 24, 2018

(87) PCT Pub. No.: WO2017/152403
PCT Pub. Date: Sep. 14, 2017

(65) Prior Publication Data
US 2019/0065912 A1    Feb. 28, 2019

(51) Int. Cl.
*G06N 7/00*    (2006.01)
*G06K 9/62*    (2022.01)
(Continued)

(52) U.S. Cl.
CPC ............ *G06K 9/6297* (2013.01); *G06F 17/18* (2013.01); *G06N 5/003* (2013.01); *G06N 7/005* (2013.01);
(Continued)

(58) Field of Classification Search
CPC ...... G06K 9/6297; G06N 20/00; G06N 5/003; G06N 7/005; G06V 10/7557; G06F 17/18
See application file for complete search history.

(56) References Cited

U.S. PATENT DOCUMENTS

| | | | |
|---|---|---|---|
| 2003/0035595 A1* | 2/2003 | Liu | G06N 3/0445 382/305 |
| 2007/0003165 A1* | 1/2007 | Sibiryakov | G06V 10/757 382/294 |

(Continued)

FOREIGN PATENT DOCUMENTS

CN    103218598 A  *  7/2013

OTHER PUBLICATIONS

Pratap, Neeraj. "A Study and Comparison of NIR Hyperspectral Imaging and other Emerging Biometric Techniques in Security System." International Journal of Computer Applications 116, No. 6 (2015). (Year: 2015).*

(Continued)

*Primary Examiner* — Casey R. Garner
(74) *Attorney, Agent, or Firm* — SV Patent Service

(57) ABSTRACT

A method and a device for MCMC framework-based sub-hypergraph matching are provided. Matching of object features is performed by constructing sub-hypergraphs. In a large number of actual images and videos, objects vary constantly, and contain various noise points as well as other interference factors, which makes image object matching and searching very difficult. Perform object feature matching by representing the appearance and positions of objects (Continued)

by sub-hypergraphs allows for faster and more accurate image matching. Furthermore, a sub-hypergraph has several advantages over a graph or a hypergraph: on one hand, a sub-hypergraph has more geometric information (e.g. angle transformation, rotation, scale, etc.) than a graph, and has a lower degree of difficulty and better extensibility than a hypergraph. On the other hand, the disclosed method and device have stronger capabilities to resist interference and good robustness, and are adaptable to more complex settings, especially with outliers.

3 Claims, 10 Drawing Sheets

(51) Int. Cl.
    *G06F 17/18*     (2006.01)
    *G06N 5/00*     (2006.01)
    *G06N 20/00*     (2019.01)
    *G06V 10/75*     (2022.01)

(52) U.S. Cl.
    CPC ......... *G06N 20/00* (2019.01); *G06V 10/7557* (2022.01)

(56) References Cited

U.S. PATENT DOCUMENTS

2013/0084008 A1*   4/2013   Othmezouri ............. G06T 7/11
                                                     382/180
2015/0173701 A1*   6/2015   Major ................. G06K 9/6297
                                                     382/131

OTHER PUBLICATIONS

Lin, Yuesong, Weiping Feng, and Huajie Chen. "Image Registration Based on Sparse Position Hypergraph Matching." In 2009 International Symposium on Computer Network and Multimedia Technology, pp. 1-4. IEEE, 2009. (Year: 2009).*

* cited by examiner

MCMC FRAMEWORK-BASED SUB-HYPERGRAPH MATCHING METHOD AND DEVICE

TECHNICAL FIELD

The present invention relates to the technical field of computer vision and image recognition technologies, and specifically, to a method and a device for an MCMC (Markov Chain Monte Carlo) framework-based sub-hypergraph matching.

BACKGROUND OF THE INVENTION

In computer vision research, feature matching has a wide range of applications, such as target detection, target recognition, tracking, and so on. In actual images, there are often some complicated changes, e.g. background clutter, deformation, repeated patterns, etc., which can result in insufficient information content for the feature descriptors. Hypergraph matching provides a powerful representation model for feature matching by describing the relationship between feature points and features. It not only can save the information of nodes and edges which are the same as those of the image, and most importantly, it increases the reference quantity of the geometric position information of the object, and acts an extension of the high-dimensional space. Therefore, feature matching in the framework of hypergraph is particularly prominent.

Hypergraph matching is widely used in network topology, big data analysis, target recognition and tracking, 3D reconstruction, scene understanding, video analysis and other fields. In particular, it has a wider versatility for image matching for non-rigid objects and deformed objects. Therefore, its research is very important. However, because it is a quadratic distribution problem in mathematics, that is, a non-deterministic polynomial (NP) problem, there are many solutions that are close to the optimal solution. Most of the solutions focus on improving the recall rate of matching, and few consider the accuracy of matching, which leads to more noise in the matching process. At the same time, when it is applied to feature matching, the integer programming problem (IQP) brings the following two problems:

(1) In most solutions, the exact number of outliers in the graph is predetermined, but it does not take into account that more outliers may occur in the solution. It is not enough to measure accuracy by considering the recall alone because precision is not taken into account.

(2) At the same time, in most solutions, the existence of outliers makes the target function miss more precise discriminability. It has been found in a large number of experiments that, when the outliers appear, the target function not only decreases accuracy, but is also more inclined to choose a solution containing more outliers for the recall. Therefore, in order to obtain the closest target function value, it is not enough only to identify inliers; it is also necessary to eliminate outliers that occur.

Thus, conventional hypergraph matching methods still have many problems in performing image feature matching, and need to be improved.

SUMMARY OF THE INVENTION

The present invention provides a method and a device for MCMC framework-based sub-hypergraph matching, which solves the problems of low feature matching efficiency and insufficient accuracy in conventional methods and systems.

In one general aspect, the present invention provides a method of MCMC framework-based sub-hypergraph matching, which includes the following steps:

constructing sub-hypergraphs, which include a first sub-hypergraph located in the original image and a second sub-hypergraph located in the image to be matched;

constructing a target function;

constructing an MCMC framework-based target distribution function; and constructing a Markov chain in the sub-hypergraph matching, and when Markov chain is balanced, outputting the sub-hypergraph matching result according to the target function.

According to another aspect, the present invention provides a device for MCMC framework-based sub-hypergraph matching, which comprises:

a sub-hypergraph constructing module configured to construct sub-hypergraphs that include a first sub-hypergraph located in the original image and a second sub-hypergraph located in the image to be matched;

a target function constructing module configured to construct a target function;

a target distribution function constructing module configured to construct an MCMC framework-based target distribution function; and a matching result output module configured to construct a Markov chain in sub-hypergraph matching, and when Markov chain is balanced, to output the sub-hypergraph matching result according to the target function.

The present invention provides a method and a device for MCMC framework-based sub-hypergraph matching, wherein matching of object features is performed by means of constructing sub-hypergraphs. In a large number of actual images and videos, objects are constantly varying, and contain various noise points as well as other interference factors, such that image object matching and searching become very difficult. However, performing object feature matching by representing the appearance and the position of an object by a sub-hypergraph allows for faster and more accurate correct matching of an image. Furthermore, a sub-hypergraph is more advantageous than a graph or hypergraph. On one hand, a sub-hypergraph has more geometric information (e.g. angle transformation, rotation, scale, etc.), and has a lower degree of difficulty and better extensibility than a hypergraph. On the other hand, the disclosed method and device have stronger capabilities to resist interference, have good robustness, and are adaptable to more complex settings, especially with outliers.

DETAILED DESCRIPTION OF THE INVENTION

The present invention is based on a design idea that the feature matching issue can be regarded as a hypergraph matching issue. Compared with images, hypergraphs not only can represent the information between the points in an image, but also can include the occurrence of various edges (such as a hyper-edge consisting of 3 points, a hyper-edge set consisting of 4 points, etc.). A sub-hypergraph is a subset of a hypergraph, that is, a hypergraph with fewer nodes than the hypergraph. Hypergraph matching is to find the best matching structure common to two graphs. A sub-hypergraph has the same valuable geometric information, but a lower complexity than the hypergraph. Moreover, sub-hypergraph matching does not require same matching points in a pair of images as required in hypergraph matching. For example, for two hypergraphs A and B, 20 points in A must match 20 points in B one by one. In the sub-hypergraphs, there may be only matching pairs for the 18 most similar points, instead of every one of the 20 points.

The present invention will become apparent from the following detailed description of embodiments and from the accompanying drawings.

Implementation Example 1

Figure 1:
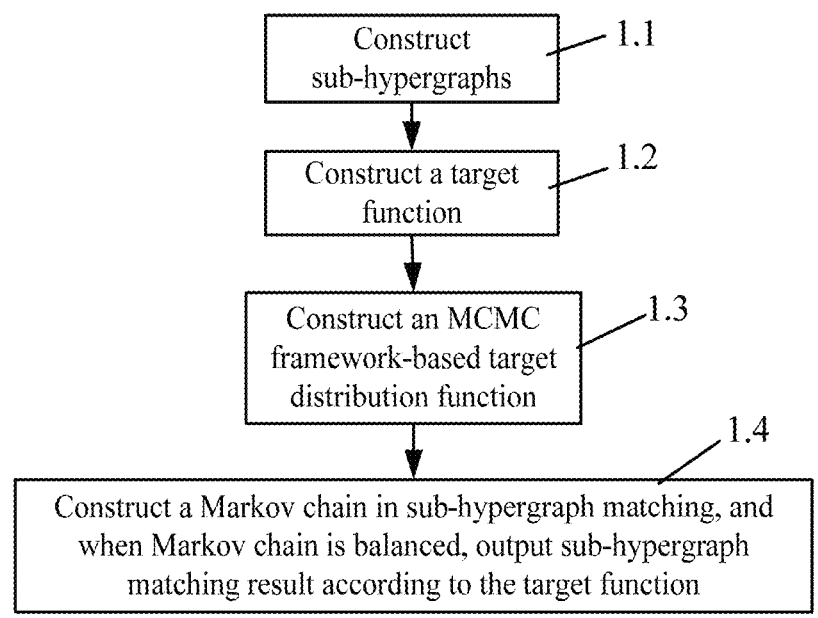
FIG. 1 illustrates a flowchart of a method for MCMC framework-based sub-hypergraph matching according to some embodiments in the present invention.

Referring to FIG. 1, a method for sub-hypergraph matching based on an MCMC framework, includes:

Step 1.1: constructing sub-hypergraphs including a first sub-hypergraph located in an original image and a second sub-hypergraph located in an image to be matched.

Step 1.2: constructing a target function.

Step 1.3: constructing a target distribution function based on the MCMC framework.

Step 1.4: constructing a Markov chain in the sub-hypergraph matching, and when Markov chain is balanced, outputting the sub-hypergraph matching result according to target function.

Figure 2:
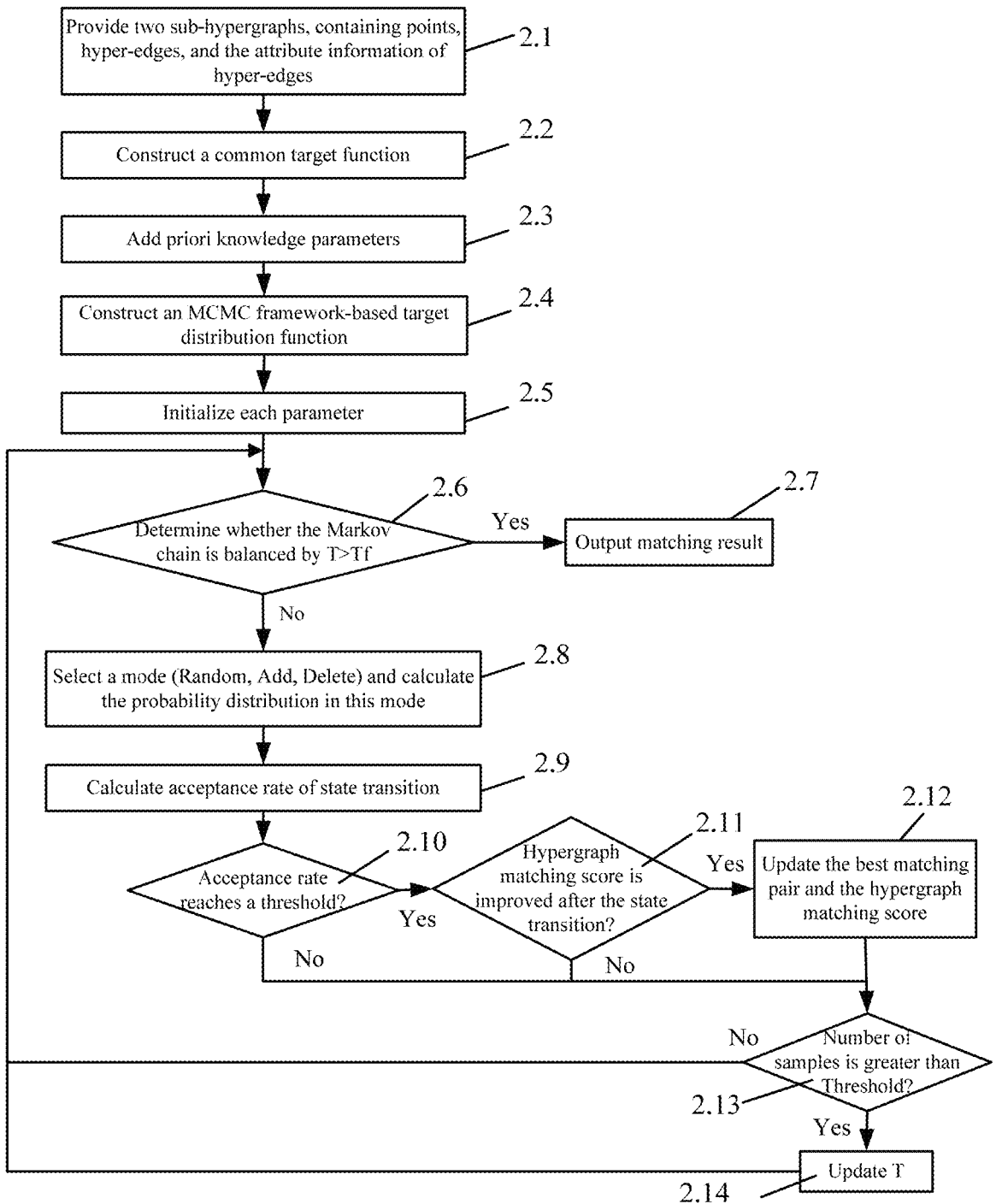
FIG. 2 illustrates a detailed flowchart of an MCMC framework-based sub-hypergraph matching method according to some embodiments in the present invention.

Referring to FIG. 2, Step 1.1 to Step 1.4 are explained further below.

The method for sub-hypergraph matching based on an MCMC framework can further include the following steps:

Step 2.1: constructing a sub-hypergraph (the first sub-hypergraph).

Two sub-hypergraphs $G^P$ (the first sub-hypergraph) and $G^Q$ (the second sub-hypergraph) are given. $G^P=(V^P, E^P, A^P)$, $G^Q=(V^Q, E^Q, A^u)$, $G^P$ contains $n^P$ points, and $G^Q$ contains $n^Q$ points, in which V represents the set of points, E represents the set of hyper-edges, and A represents the attribute information of hyper-edges. A hyper-edge allows connection with an "edge" of any number of vertices, i.e., the hyper-edge is an edge with n points joined together. In this example, n can be 3, that is, V is a set of edges in which all 3 points are connected. In other implementations, the value of n can be set as required.

Use X as an adjacency matrix of the two sub-hypergraphs. If $X_{pq}$ is equal to 1, it means that the $p^{th}$ point in $V^P$ matches the $q^{th}$ point in $V^Q$; otherwise, $X_{pq}$ is equal to 0. Describe it as regular, as shown in Formula (1) below:

$$M = \left\{ X \in \{0, 1\}^{n^P \times n^Q} \;\middle|\; \sum_{p=1}^{n^P} X_{pq} \leq 1, \sum_{q=1}^{n^Q} X_{pq} \leq 1 \right\} \quad (1)$$

Step 2.2: constructing a common target function.

In sub-hypergraph matching, the similarity function is represented by $S_d(a_{p^d}^{P}, a_{q^d}^{q})$, which is used to measure the similarity between the hyper-edge $S_{p1,\ldots,pd}^{P}$ and $e_{q1,\ldots,qd}^{Q}$ in the two d-dimension sub-hypergraphs. Therefore, the overall similarity of the d-dimension hypergraph is expressed by Formula (2) below, where $\gamma^d$ is the weight of the d-dimension spatial similarity H.

$$H_{1,\ldots,d}^{d} = S_d(e_{p_1,\ldots,p_d}^{P}, e_{q_1,\ldots,q_d}^{Q}) + \gamma^{d-1} \sum_{i=1}^{d} H_{(1,\ldots,d)\setminus i}^{d-1}, \quad (2)$$

$$H_i^1 = S_1(e_{p_1}^{P}, e_{q_1}^{Q})$$

Therefore, the hypergraph matching score can be described as the sum of the similarities of the d-dimension hyper-edges as shown in Formula (3) below:

$$\text{Score}(x) = \sum_{1,\ldots,d} H_{1,\ldots,d} x_1 \ldots x_d. \quad (3)$$

Therefore, it is necessary to find the best matching pair, that is, the matching pair x* having the highest hypergraph matching score in the above Formula (3), as shown in Formula (4) below.

$$x^* = \underset{x}{\text{argmax}}\; \text{Score}(x). \quad (4)$$

However, this problem is a non-deterministic polynomial (i.e. a NP problem), and the integer quadratic programming problem (IQP) cannot find the optimal solution, such that the method of finding a suitable solution is very important.

In some embodiments, the similarity measurement method is different from conventional methods. Regarding the dimension of the sub-hypergraph, those with higher than 2 dimensions can be considered sub-hypergraphs. For simplicity, let the dimension d=3. The similarity of hyper-edges in the constructed hypergraph can be measured by a similarity tensor of O. Duchenne. The physical meaning is to find all the triangles in a graph according to the point information in the hypergraph (characterized points in the image), so that information such as points, edges, and angle rotations are included. Tensors such as triangles are used as tuples for matching.

In some embodiments, the process of constructing a triangle can adopt the following method:

When the number of points in the first sub-hypergraph is greater than the first threshold, the number of triangles is determined as the product of the number of points in the two sub-hypergraphs, that is, $n^P * n^Q$. otherwise, the number of triangles is determined as the maximum number of triangles in the first sub-hypergraph that can be formed by all points, that is, the combination number $C_{n^P}^{e}$ of any three points among the $n^P$ points of $G^P$ is used to find the set of points corresponding to $G^Q$. The value of the first threshold is set as required.

If the number of triangles is simply determined as the product of the number of points in the two sub-hypergraphs, a combination of $n^P * n^Q$ triangles will be randomly selected, which may miss an important set of triangle combination points; when the number of triangles is determined as the maximum number of triangles in the first sub-hypergraph that can be formed by all points, all cases are taken into consideration, which is more comprehensive. However, when the number of points is larger than a certain value, the consideration of thinning is very important. Otherwise, a lot of time is wasted. Therefore, in this case, the number of triangles can be determined as the product of the number of points in the two sub-hypergraphs. Certainly, when the equipment allows or high speed is not required, it is the best choice to determine the number of triangles as the maximum number of triangles in the first sub-hypergraph that can be formed by all points.

The method of constructing a triangle adopted disclosed herein can improve the matching efficiency while ensuring the matching accuracy.

Step 2.3: obtaining the priori knowledge parameters by learning, and adding the priori knowledge parameters to the ordinary target function.

This implementation describes a method for sub-hypergraph matching based on an MCMC framework and a meta-algorithm. In order to obtain better expression, this implementation preferably integrates a priori strategy into the original problem (Formula (4)).

First, the parameter β and the target function of the priori knowledge are obtained. A reliable priori knowledge is added to the original problem (Formula (4)), that is, the second term $\beta^T D(\|x\|)$ in Formula (5) below. β is obtained through the learning method of the graph; it represents the degree of compactness, that is, the probability density. It is also a kind of weight, determined by the similarity measure method and the size of the sub-hypergraph. $D(\|x\|)$ represents the Euclidean distance of x. In this example, adding priori knowledge parameters not only reduces the search space, but also lays a foundation for accurate search and quick matching.

$$x^* = \underset{x}{\operatorname{argmax}} \ Score(x) - \beta^T D(\|x\|) \quad (5)$$

Next, Formula (5) is necessarily solved to obtain the best matching pair, and to output the result of sub-hypergraph matching.

Step 2.4: constructing a target distribution function in an MCMC framework.

The state space defined in the MCMC framework is Y. The target distribution and the probability density of each state y∈Y are π(y). Since the probability density is proportional to the target distribution, it is sufficient to use one of them to represent, as shown in Formula (6) below. Where the annealing simulation value T is used to control the variation of the distribution. f(y) is the value that makes the hypergraph matching score Score(x) the largest in the current y state.

$$\pi(y) \propto \exp\left(\frac{Score(f(y)) - \beta^T D(\|f(y)\|)}{T}\right) \quad (6)$$

$$f(y) = \underset{x}{\operatorname{argmax}} \ Score(x)$$

where Score(x) is the hypergraph matching score, $\beta^T D(\|f(y)\|)$ is the priori knowledge parameter obtained by learning, β is the probability density, $D(\|f(y)\|)$ is the Euclidean distance of f (y), f (y) is the maximum value of the hypergraph matching score Score(x) in the current y state, and T is the annealing simulation value.

Step 2.5: initializing each parameter, for example, initializing the annealing simulation value T.

Construct a Markov chain in the sub-hypergraph matching, that is, Step 1.4 in FIG. 1, which specifically includes the following steps:

Step 2.6: determining whether the Markov chain is balanced, and whether the annealing simulation value T is greater than a preset threshold Tf. If so, go to Step 2.7; otherwise, go to Step 2.8.

Step 2.7: When Markov chain is balanced and the annealing simulation value T is greater than a preset threshold Tf, it indicates that the best matching pair obtained has met the requirements, and therefore, output the matching result.

Step 2.8: selecting a mode (Random, Add, or Delete) and calculating the probability distribution in this mode.

In order to construct a good Markov chain, the Metropolis-Hastings algorithm is adopted in this example. The state transition kernel function is shown in Formula (7) below, where μ(mode) is the probability density of a mode, which can be one of three modes: Random, Add, and Delete. For different modes, there is a different probability distribution q(y,y') from the current state y to the next state y'. It should be noted that the Random mode is applied to the initial stage, and a certain point of the first sub-hypergraph is randomly selected. The Add and Delete modes are used in stages other than initial stage, that is, in the subsequent matching process, wherein: μ(add)+μ(delete)=1,μ(add) is the probability density of the Add mode, and μ(delete) is the probability density of the Delete mode.

$$Q(y,y')+\mu(\text{mode}) \cdot q(y,y') \quad (7)$$

According to the mode described above, and the relationship between Add and Delete, if μ(add)=0.5 is assumed, it means that half of the probability is Add mode at each time of point selection, and the other half of the probability is the Delete mode.

Figure 3:
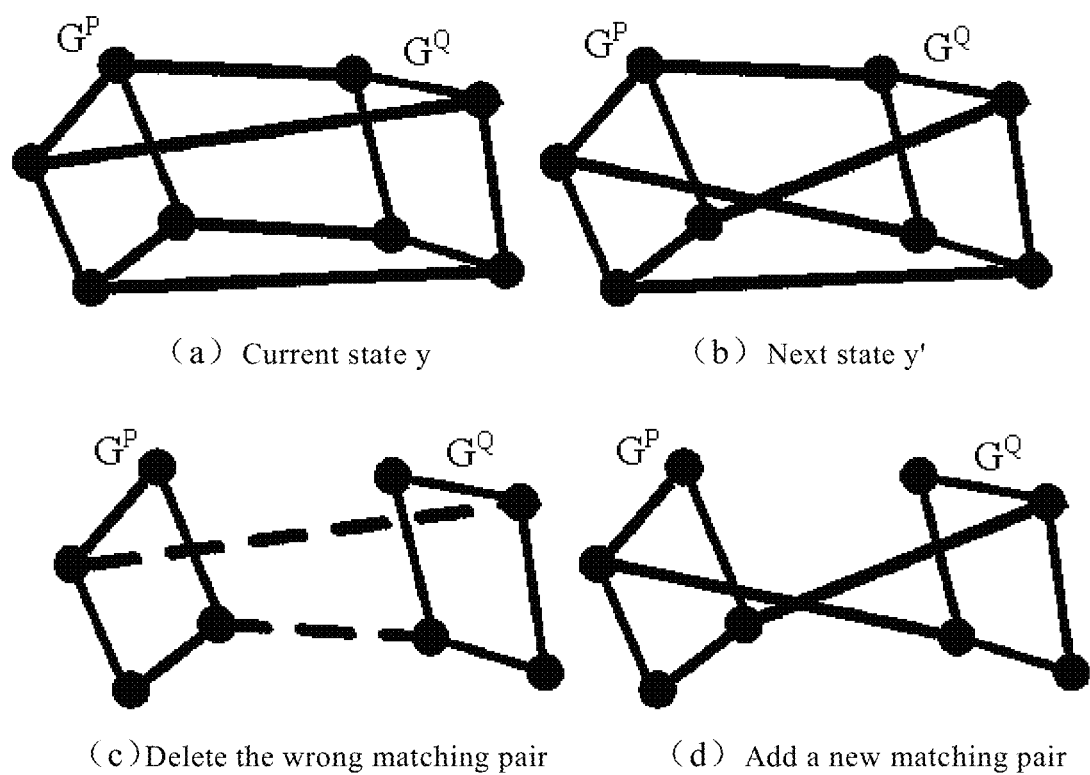
FIG. 3 illustrates a schematic view of Add and Delete processes in state transition in a method of MCMC framework-based sub-hypergraph matching according to some embodiments in the present invention.
Figure 4:
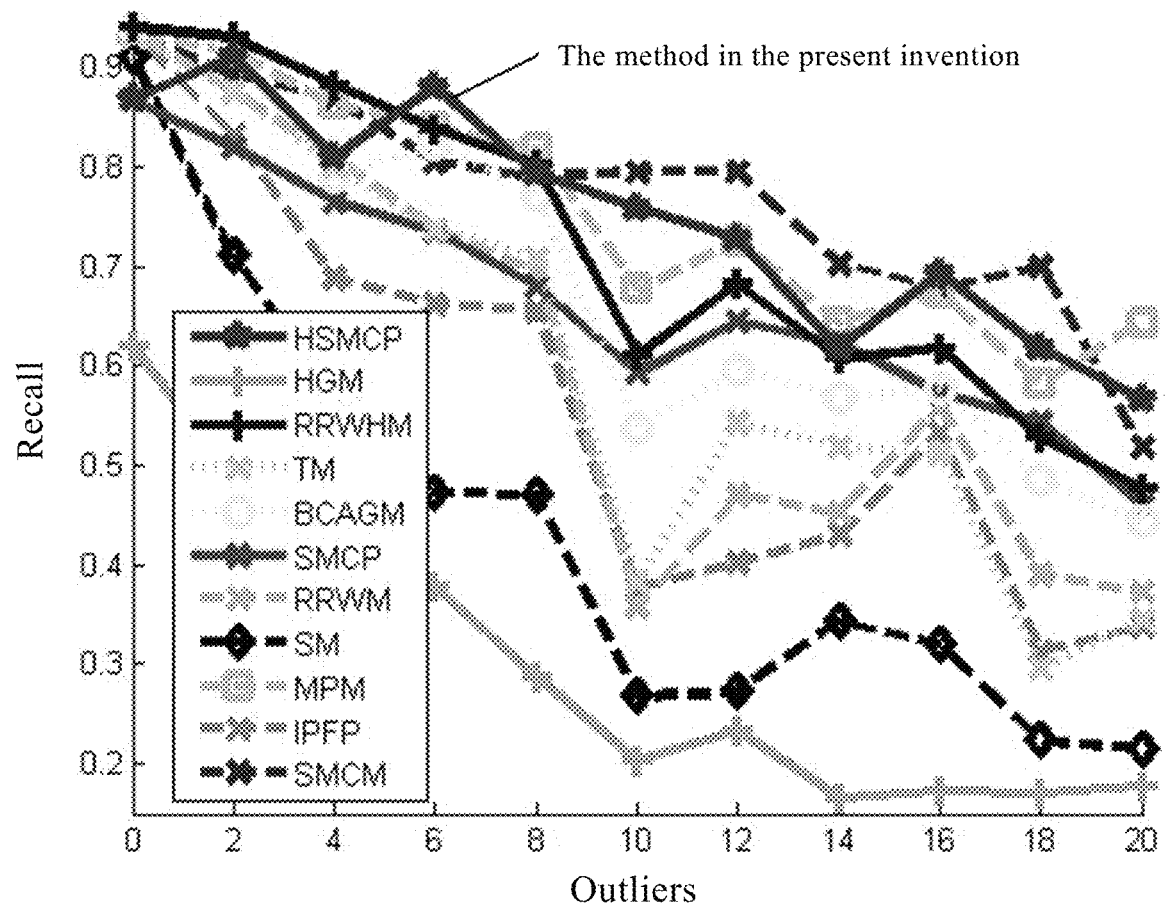
FIGS. 4-9 are schematic views of comparisons between the recall, the accuracy rate, and the F value obtained by performing image matching using the presently disclosed method and other conventional methods.
Figure 5:
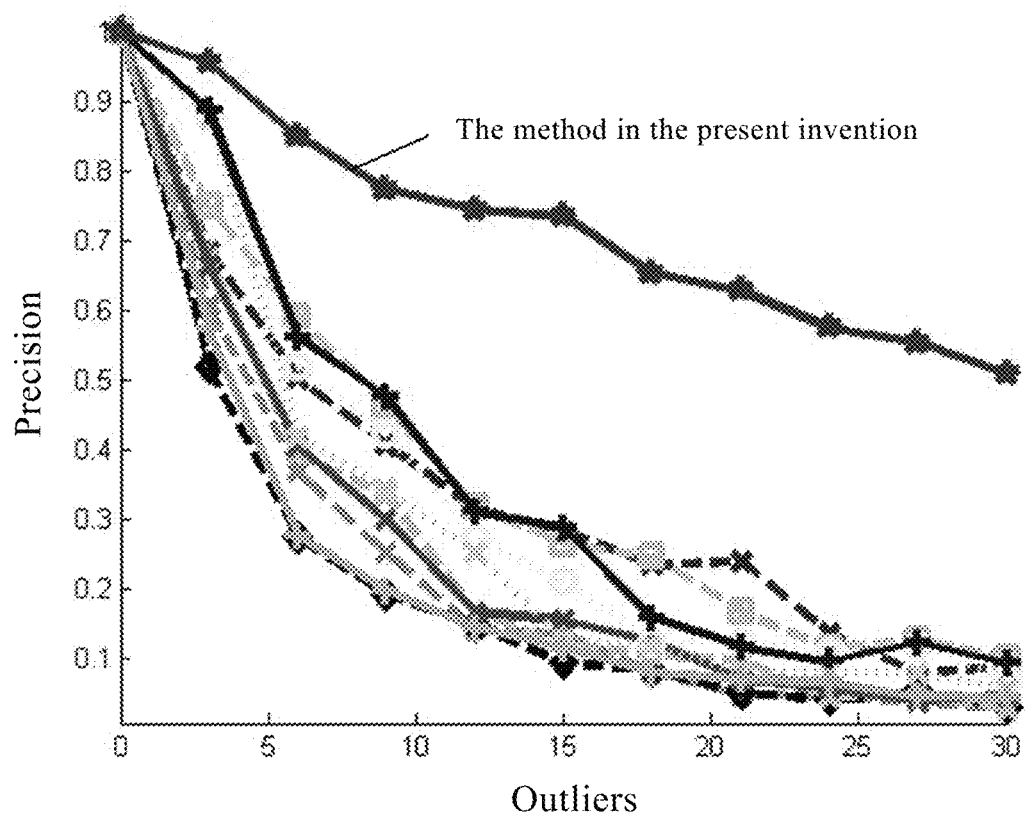
Figure 6:
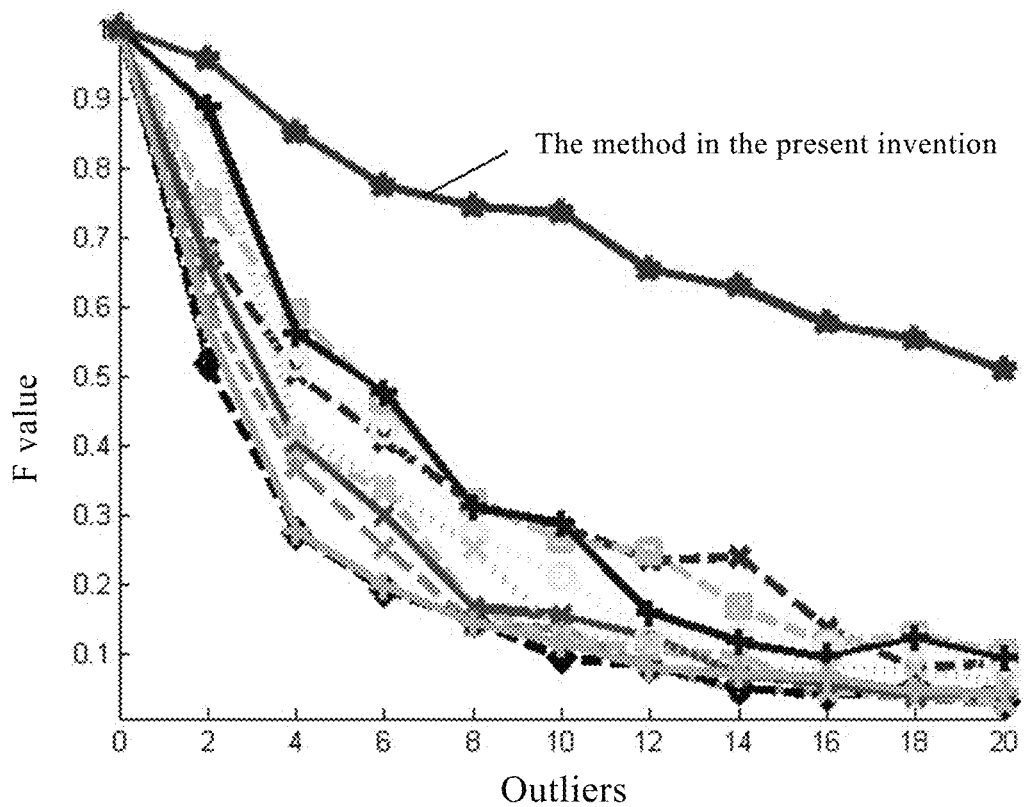
Figure 7:
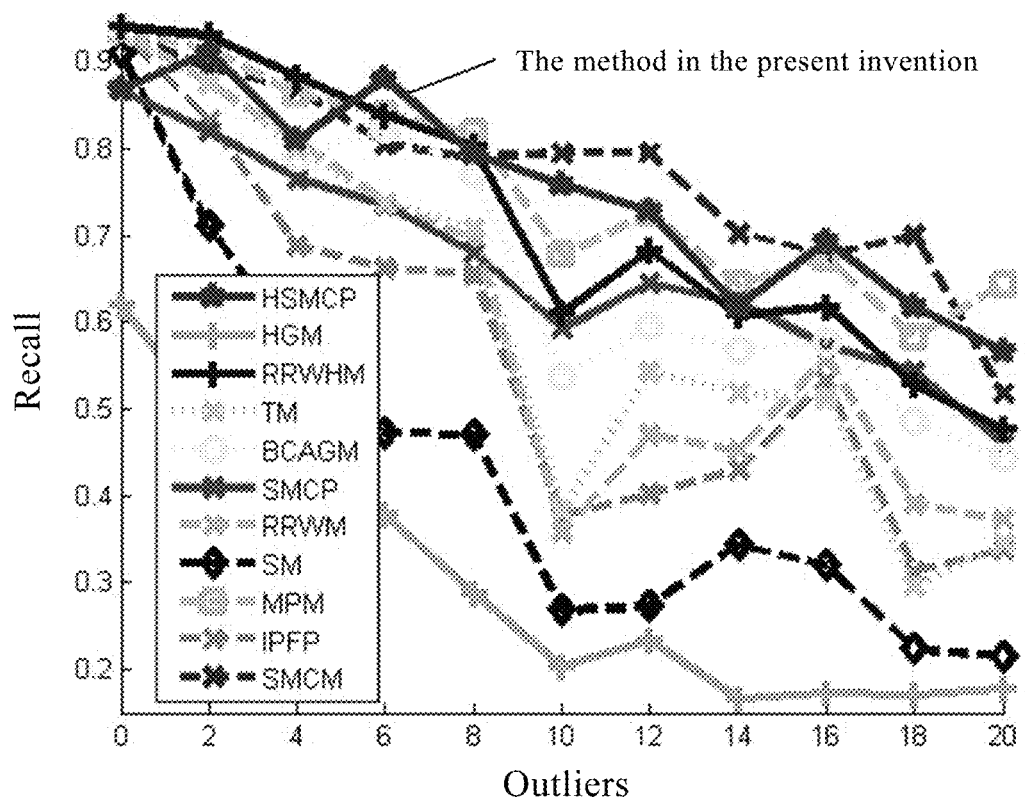
Figure 8:
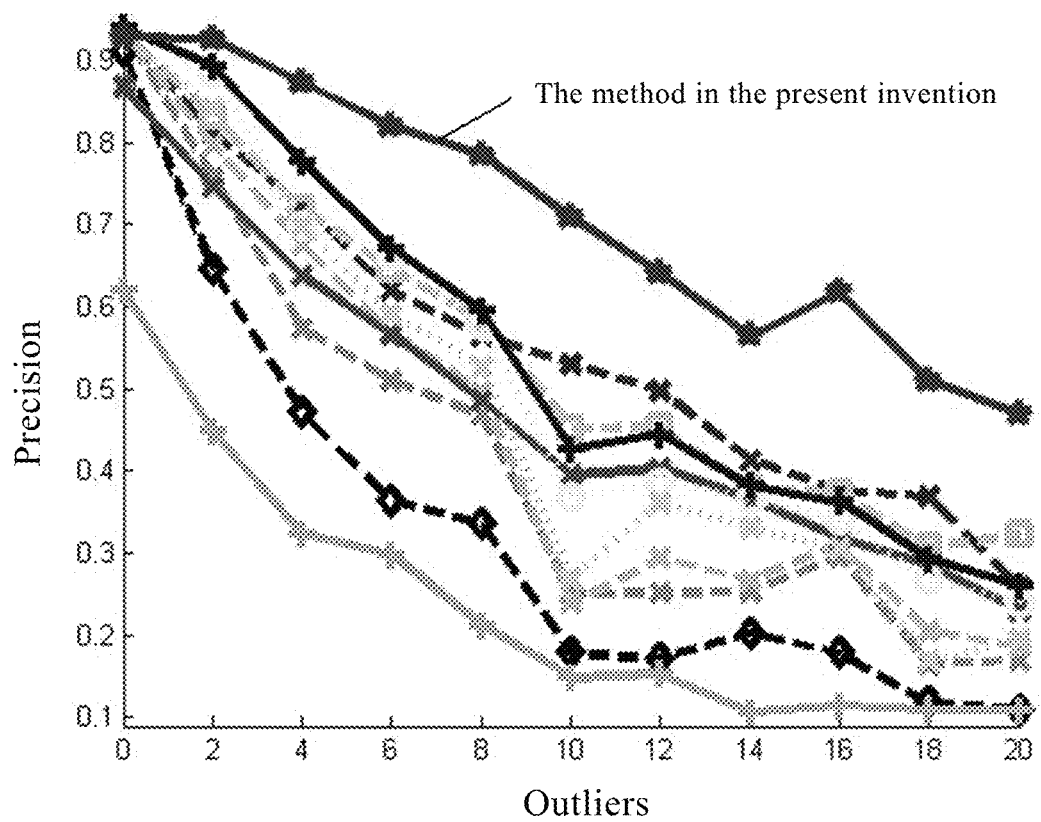
Figure 9:
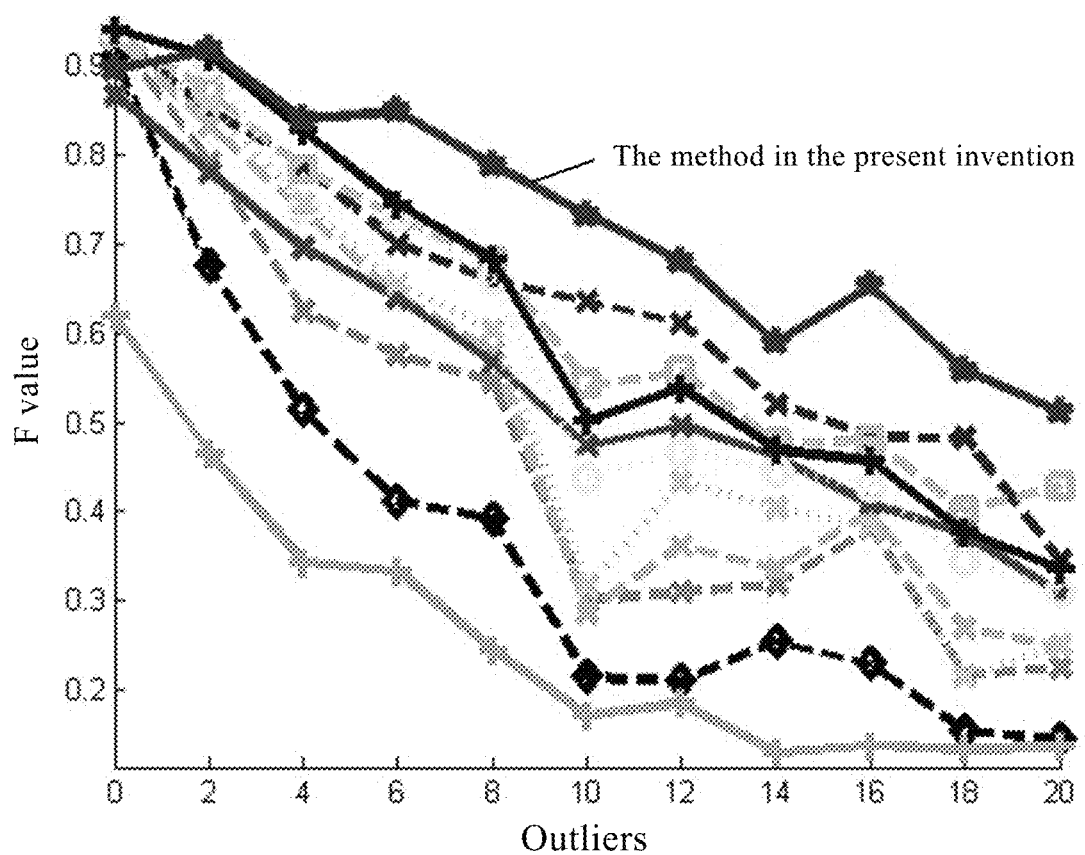

FIG. 3 illustrates a schematic view of Add and Delete processes in state transition, where (a) is the matching relationship of the current state y, (b) is the matching relationship of the next state y', (c) is a schematic diagram of deleting a wrong matching pair, and (d) is a schematic diagram of adding a new matching pair.

There are different probability distributions in different modes. In this implementation, the probability distributions in Random, Add, and Delete modes are (the probability distribution in other cases is 0):

$$q(y, y') = \begin{cases} \frac{1}{n^F}, & \|y' - y\|_1 = 1 \ \&\& \ y' \in Y \\ \frac{1}{Z} e^{-d(y,y')}, & \|y'\|_1 = \|y\|_1 + 1 \ \&\& \ y' \in Y \\ \frac{1}{\|y\|_1}, & \|y'\|_1 = \|y\|_1 - 1 \ \&\& \ y' \in Y \\ 0, & \text{otherwise} \end{cases} \quad (8)$$

Step 2.9: calculating the acceptance rate α of the current state y to the next state y' using Formula (9):

$$\alpha(y, y') = \min\left\{1, \frac{\pi(y')}{\pi(y)} \frac{Q(y', y)}{Q(y, y')}\right\} \quad (9)$$

Step 2.10: comparing the calculated acceptance rate α with a preset threshold, and determining whether the acceptance rate α reaches a threshold, to determine whether the matching information and the hypergraph matching score in the next state y' are accepted. If so, go to Step 2.11; otherwise, go to Step 2.13.

Step 2.11: when the acceptance rate α reaches the preset threshold, further determining whether the hypergraph matching score is improved after the state transition. If the state transition is accepted, go to Step 2.12; otherwise, go to Step 2.13.

Step 2.12: accepting the state transition, and updating the best matching pair and the hypergraph matching score. In other words, the best matching pair information and the hypergraph matching score of the sub-hypergraph are all updated to the best matching pair information and the hypergraph matching score in the y' state.

Step 2.13: regardless of whether the state transition is accepted or not, this step determines whether the number of samples is greater than a predetermined threshold. If yes, go to Step 2.14; otherwise, go to Step 2.6.

Step 2.14: updating the annealing simulation value T.

Specifically, the annealing simulation value is T, the number of samples is N, both having initial values of 0. The threshold corresponding to the number of samples is Nmax (that is the sample threshold). The threshold corresponding to the annealing analog value is Tf (that is the end value of the annealing simulation). When the annealing simulation value T is larger than the annealing simulation end value Tf, the cycle ends. For each cycle, when y' is sampled every time, the number of samples N is increased by 1. When N>Nmax, T is updated, that is T=T*C and N=0, where C is the annealing factor.

The present invention provides a method and a device for sub-hypergraph matching based on an MCMC framework. Matching of object features is performed by constructing sub-hypergraphs. In a large number of actual images and videos, objects are constantly transforming, and contain various noise points as well as other interference factors, such that image object matching and searching becomes very difficult. Representing the appearance and position of an object by a sub-hypergraph in order to perform object feature matching allows for faster and more accurate correct matching of an image. Furthermore, a sub-hypergraph is more advantageous than a graph or hypergraph. On one hand, a sub-hypergraph has more geometric information (e.g. angle transformation, rotation, scale, etc.), and has a lower degree of difficulty and better extensibility than a hypergraph. On the other hand, the disclosed method and device have stronger capabilities to resist interference, have good robustness, and are adaptable to more complex settings, especially with outliers.

In the method provided in this embodiment, the matching between the points is performed one by one, rather than completed together, and the discretization operation is used to implement one-to-one matching, thereby making the matching more accurate and closer to the matching target. For the display of matching results, for the constantly changing outliers, the recall and precision measures are used to measure them, the F curve is drawn, and F=2*(recall*Precision)/(recall+precision) is used to measure the matching result as a whole. The higher F is, the better the matching result is. Measuring the matching result by the disclosed measurement method can well overcome the over-sided disadvantage in the conventional measurement method. In practice, the disclosed measurement method is more practical and universal for the cases where the outliers are not fixed.

FIGS. 4-9 illustrate schematic views of comparisons between the recall rate, the precision rate, and the F value obtained by performing image matching by using the presently disclosed method versus other conventional methods.

Implementation Example 2

Figure 10:
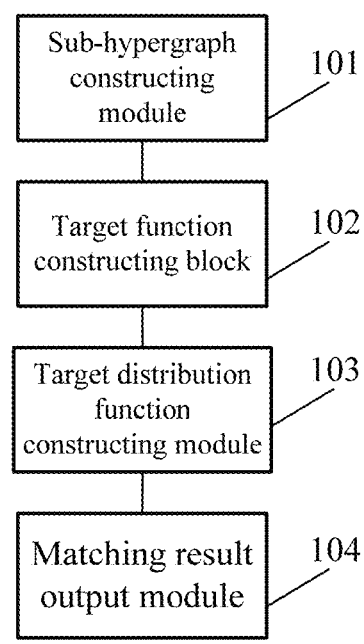
FIG. 10 illustrates a schematic module view of a device for MCMC framework-based sub-hypergraph matching according to some embodiments in the present invention.

Referring to FIG. 10, based on the method provided above in Implementation Example 1, this implementation example provides a device for sub-hypergraph matching in an MCMC framework. The device includes a sub-hypergraph constructing module 101, a target function constructing module 102, a target distribution function constructing module 103, and a matching result output module 104.

The sub-hypergraph constructing module 101 can construct sub-hypergraphs, which include a first sub-hypergraph located in the original image and a second sub-hypergraph located in the image to be matched.

The target function constructing module 102 can construct a target function.

The target distribution function constructing module 103 can construct an MCMC framework-based target distribution function.

The matching result output module 104 can construct a Markov chain in the sub-hypergraph matching, and when Markov chain is balanced, output the sub-hypergraph matching result according to target function.

In this embodiment, the matching result output module 104 can use the triangle tensor as a tuple for matching in the sub-hypergraph matching process, and construct a triangle tensor in the following manner: when the number of points in the first sub-hypergraph is greater than the first threshold, the number of triangles is determined as the product of the number of points in the two sub-hypergraphs; otherwise, the number of triangles is determined as the maximum number of triangles in the first sub-hypergraph that can be formed by all points.

The target function constructing module 102 can obtain a priori knowledge parameters by learning, and add priori knowledge parameters to the target function.

The target distribution function constructing module 103 can define a state space Y in the MCMC framework, where each state y∈Y, the target distribution is π(y), $$\pi(y) \propto \exp\left(\frac{\text{Score}(f(y)) - \beta^T D(\|f(y)\|)}{T}\right)$$

$$f(y) = \underset{x}{\arg\max}\ \text{Score}(x),$$

where Score(x) is the hypergraph matching score, $\beta^T D(\|f(y)\|)$ is the priori knowledge parameter obtained by learning, β is the probability density, and $D(\|f(y)\|)$ is the Euclidean distance off (y), f (y) is the maximum value of the hypergraph matching score Score(x) in the current y state, and T is the annealing simulation value.

The matching result output module is configured to construct a Markov chain in the sub-hypergraph matching, wherein the state transition kernel function is:

$$Q(y, y') = \mu(\text{mode}) \cdot q(y, y'),$$

where μ(mode) is the probability density of mode, including three modes: Random, Add, and Delete, and q(y,y') is a probability distribution from the current state y to the next state y'.

The probability distributions in the three modes of Random, Add, and Delete are:

$$q(y, y') = \begin{cases} \frac{1}{n^F}, & \|y' - y\|_1 = 1 \ \&\& \ y' \in Y \\ \frac{1}{Z}e^{-d(y,y')}, & \|y'\|_1 = \|y\|_1 + 1 \ \&\& \ y' \in Y \\ \frac{1}{\|y\|_1}, & \|y'\|_1 = \|y\|_1 - 1 \ \&\& \ y' \in Y \\ 0, & \text{otherwise} \end{cases}$$

The device provided in this implementation example corresponds to the method provided in Implementation Example 1 above, and details of the specific execution steps of the device are not described herein.

It is understood by those skilled in the field that all or part of steps of various methods according to the embodiments may be programmed to instruct the associated hardware to achieve the goals, which may be stored in a readable storage medium of computer, e.g. read-only memory, random access memory, disk, or CD.

The above contents are further detailed description of the present invention in connection with the disclosed embodiments. The invention is not limited to the embodiments referred to, but may be varied and modified by those skilled in the field without departing from the conception of the present invention.

What is claimed is:

1. An MCMC framework-based sub-hypergraph matching method, comprising:
   in computer vision for recognizing an object image, constructing sub-hypergraphs that comprise a first sub-hypergraph located in an original image and a second sub-hypergraph located in the object image to be matched to the original image;
   constructing a target function;
   constructing a target distribution function based on an MCMC framework; and
   constructing a Markov chain for matching the first sub-hypergraph in the original image and the second sub-hypergraph in the original image; and
   when Markov chain is balanced, outputting a sub-hypergraph matching result for degree of matching between the object image and the original image according to the target function,
   wherein a triangle tensor is used as a tuple for matching in the first sub-hypergraph and the second sub-hypergraph, the method further comprising:
   constructing the triangle tensor, comprising:
      when number of points in the first sub-hypergraph is greater than a first threshold, determining a number of triangles as a product of the number of points in the first sub-hypergraph and the second sub-hypergraph; and
      otherwise, determining a number of triangles as a maximum number of triangles in the first sub-hypergraph that are formed by all points.

2. A method according to claim 1, further comprising:
   adding priori knowledge parameters to the target function, wherein the priori knowledge parameters are obtained by learning.

3. A method according to claim 2, wherein in step of constructing the Markov chain for matching the first sub-hypergraph and the second sub-hypergraph comprises defining a state transition kernel function:

$$Q(y,y') = \mu(\text{mode}) \cdot q(y,y'),$$

where μ(mode) is a probability density for modes including: Random, Add, and Delete, wherein is a probability distribution from the current state y to a next state y'.

* * * * *